(12) United States Patent
Tang (10) Patent No.: US 11,246,133 B2
(45) Date of Patent: Feb. 8, 2022

(54) SIGNAL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 561 days.

(21) Appl. No.: 16/335,654

(22) PCT Filed: Jan. 12, 2018

(86) PCT No.: PCT/CN2018/072477
§ 371 (c)(1),
(2) Date: Mar. 21, 2019

(87) PCT Pub. No.: WO2019/136711
PCT Pub. Date: Jul. 18, 2019

(65) Prior Publication Data
US 2021/0360625 A1    Nov. 18, 2021

(51) Int. Cl.
*H04W 72/04* (2009.01)
*H04L 5/00* (2006.01)

(52) U.S. Cl.
CPC ....... *H04W 72/0453* (2013.01); *H04L 5/0053* (2013.01)

(58) Field of Classification Search
CPC .................. H04W 72/0453; H04L 5/0053

USPC ......................................................... 370/329
See application file for complete search history.

(56) References Cited

FOREIGN PATENT DOCUMENTS

| CN | 104205696 A | 12/2014 |
| CN | 104869649 A | 8/2015 |
| CN | 104995855 A | 10/2015 |
| CN | 105122713 A | 12/2015 |
| CN | 106160990 A | 11/2016 |
| CN | 106211334 A | 12/2016 |
| CN | 107431900 A | 12/2017 |
| CN | 107432021 A | 12/2017 |

(Continued)

OTHER PUBLICATIONS

Extended European Search Report for EP patent application No. 18847233.6, dated Sep. 27, 2019.

(Continued)

*Primary Examiner* — Angel T Brockman
(74) *Attorney, Agent, or Firm* — Ladas & Parry, LLP (57) ABSTRACT

The application provides a signal transmission method, a terminal device and a network device. In the method, transmission of a Primary Synchronization Signal (PSS) in an SS block occupies M PRBs, a ZP CSI-RS is located on N PRBs. In a case where the ZP CSI-RS is located on a symbol occupied by the SS block, the terminal device determines that at least one first RE does not include the ZP CSI-RS or determines that the at least one first RE includes the ZP CSI-RS, the at least one first RE being at least one RE, except one or more REs overlapped with the maximum-frequency PRB in the M PRBs, in a first PRB, and/or, the at least one first RE being at least one RE, except one or more REs overlapped with the minimum-frequency PRB in the M PRBs, in a second PRB

20 Claims, 6 Drawing Sheets

(56) References Cited

FOREIGN PATENT DOCUMENTS

WO    2017171617 A1    10/2017

OTHER PUBLICATIONS

Intel Corporation: "On multiplexing of different RS types", 3GPP Draft; R1-1717371 On Multiplexing of Different RS Types, 3rd Generation Partnership Project (3GPP), vol. RAN WG1, no. Prague, CZ Oct. 9, 2017-Oct. 13, 2017 Oct. 8, 2017 (Oct. 8, 2017), XP051340561.
Nokia et al: "Remaining details on NR-PBCH", 3GPP Draft; R1-1716524, 3rd Generation Partnership Project (3GPP), vol. RAN WG1, no. Nagoya, Japan; Sep. 18, 2017-Sep. 21, 2017 Sep. 17, 2017 (Sep. 17, 2017), XP051339977.
First Office Action from CN app. No. 201880003181.X, dated Nov. 29, 2019, with English translation from Global Dossier.
International Search Report for PCT/CN2018/072477, dated Sep. 27, 2018.
Written Opinion of the International Searching Authority for PCT/CN2018/072477, dated Sep. 27, 2018.

SIGNAL TRANSMISSION METHOD, TERMINAL DEVICE AND NETWORK DEVICE

CROSS-REFERENCE TO RELATED APPLICATION

The present application is the U.S. national phase application of PCT Application No. PCT/CN2018/072477 filed on Jan. 12, 2018, the disclosure of which is incorporated herein in its entirety by reference.

TECHNICAL FIELD

The application relates to the field of communication, and more particularly to a signal transmission method, a terminal device and a network device.

BACKGROUND

In 5-Generation New Radio (5G NR), a mapping sequence of a Synchronization Signal (SS) block is listed in an order as follows: Primary Synchronization Signal (PSS)/Physical Broadcast Channel (PBCH)/Secondary Synchronization Signal (SSS)/PBCH. Herein, the PSS/SSS occupies a first symbol and a third symbol respectively, and the PBCH occupies a second symbol and a fourth symbol. A Channel State Information Reference Signal (CSI-RS) may be configured on a time-domain symbol where an SS block is located, and a Zero Power Channel State Information Reference Signal (ZP CSI-RS) may be located on symbols {0, 1, 2, 5, 6, 7, 8, 9, 10, 12, 13}.

When a Physical Resource Block (PRB) grid occupied by an SS block is not aligned with a common PRB grid configured for data transmission, a minimum-frequency PRB and a maximum-frequency PRB for the SS block may be partially overlapped with corresponding common PRBs respectively. When a bandwidth occupied by a ZP CSI-RS is overlapped with a bandwidth of an SS block, how to determine a resource location of the ZP CSI-RS on one or more symbols overlapped or partially overlapped with the SS block is a problem to be solved.

SUMMARY

Embodiments of the application provide a signal transmission method, a terminal device and a network device. In a case where a ZP CSI-RS is located on a symbol occupied by an SS block, the terminal device can determine a Resource Element (RE) occupied by the ZP CSI-RS under the condition that a PRB grid for the SS block is inconsistent with a common PRB grid.

A first embodiment of the application provides a signal transmission method. In the signal transmission method, transmission of an SS block occupies M PRBs, a ZP CSI-RS is located on N PRBs, the N PRBs may include a first PRB and/or a second PRB, the first PRB may be partially overlapped with a maximum-frequency PRB in the M PRBs, and the second PRB may be partially overlapped with a minimum-frequency PRB in the M PRBs, M and N being positive integers, and in a case where the ZP CSI-RS is located on a symbol occupied by the SS block, the method may include that:

a terminal device determines that at least one first RE does not include the ZP CSI-RS or determines that the at least one first RE includes the ZP CSI-RS, the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

Accordingly, in the signal transmission method of the embodiments of the application, in a case where the ZP CSI-RS is located on the symbol occupied by the SS block, the terminal device may determine that the at least one first RE does not include the ZP CSI-RS or determine that the at least one first RE includes the ZP CSI-RS, so that the terminal device can determine one or more REs occupied by the ZP CSI-RS in the at least one first RE under the condition that a PRB grid for the SS block is inconsistent with a common PRB grid.

In an exemplary implementation mode of the first embodiment, in a case where the terminal device determines that the at least one first RE includes the ZP CSI-RS, the method may further include that:

the terminal device determines, according to a pattern of the ZP CSI-RS and the at least one first RE, one or more REs occupied by the ZP CSI-RS in the at least one first RE.

Therefore, when the at least one first RE includes the ZP CSI-RS, the terminal device may determine one or more REs occupied by the ZP CSI-RS in the at least one first RE based on the pattern of the ZP CSI-RS.

In an exemplary implementation mode of the first embodiment, the operation that the terminal device determines that the at least one first RE does not include the ZP CSI-RS or determines that the at least one first RE includes the ZP CSI-RS may include that:

the terminal device determines that the at least one first RE does not include the ZP CSI-RS or determines that the at least one first RE includes the ZP CSI-RS according to first configuration information, the first configuration information indicating that the at least one first RE does not include the ZP CSI-RS or indicating that the at least one first RE includes the ZP CSI-RS.

In an exemplary implementation mode of the first embodiment, before the operation that the terminal device determines that the at least one first RE does not include the ZP CSI-RS or determines that the at least one first RE includes the ZP CSI-RS according to the first configuration information, the method may further include that:

the terminal device receives the first configuration information from a network device through system broadcast signaling or Radio Resource Control (RRC) dedicated signaling.

In an exemplary implementation mode of the first embodiment, the operation that the terminal device determines that the at least one first RE does not include the ZP CSI-RS or determines that the at least one first RE includes the ZP CSI-RS may include that:

the terminal device determines that the at least one first RE does not include the ZP CSI-RS or determines that the at least one first RE includes the ZP CSI-RS according to first preconfiguration information, the first preconfiguration information indicating that the at least one first RE does not include the ZP CSI-RS or indicating that the at least one first RE includes the ZP CSI-RS.

In an exemplary implementation mode of the first embodiment, transmission of a PSS in the SS block may occupy L PRBs, the N PRBs may include a third PRB and/or a fourth PRB, the third PRB may be partially overlapped with a maximum-frequency PRB in the L PRBs, the fourth PRB may be partially overlapped with a minimum-frequency PRB in the L PRBs, L being a positive integer larger than M, and in a case where the ZP CSI-RS is located on a symbol occupied by the PSS in the SS block, the method may further include that:

the terminal device determines that at least one second RE does not include the ZP CSI-RS or determines that the at least one second RE includes the ZP CSI-RS, the at least one second RE being at least one RE, except one or more REs overlapped with the maximum-frequency PRB in the L PRBs, in the third PRB, and/or, the at least one second RE being at least one RE, except one or more REs overlapped with the minimum-frequency PRB in the L PRBs, in the fourth PRB.

Accordingly, in the signal transmission method of the embodiments of the application, in a case where the ZP CSI-RS is located on the symbol occupied by the SS block, the terminal device may determine that the at least one second RE does not include the ZP CSI-RS or determine that the at least one second RE includes the ZP CSI-RS, so that the terminal device can determine one or more REs occupied by the ZP CSI-RS in the at least one second RE under the condition that the PRB grid for the SS block is inconsistent with the common PRB grid.

In an exemplary implementation mode of the first embodiment, in a case where the terminal device determines that the at least one second RE includes the ZP CSI-RS, the method may further include that:

the terminal device determines, according to a pattern of the ZP CSI-RS and the at least one second RE, one or more REs occupied by the ZP CSI-RS in the at least one second RE.

Therefore, when the at least one second RE includes the ZP CSI-RS, the terminal device may determine one or more REs occupied by the ZP CSI-RS in the at least one second RE based on the pattern of the ZP CSI-RS.

In an exemplary implementation mode of the first embodiment, the operation that the terminal device determines that the at least one second RE does not include the ZP CSI-RS or determines that the at least one second RE includes the ZP CSI-RS may include that:

the terminal device determines that the at least one second RE does not include the ZP CSI-RS or determines that the at least one second RE includes the ZP CSI-RS according to second configuration information, the second configuration information indicating that the at least one second RE does not include the ZP CSI-RS or indicating that the at least one second RE includes the ZP CSI-RS.

In an exemplary implementation mode of the first embodiment, before the operation that the terminal device determines that the at least one second RE does not include the ZP CSI-RS or determines that the at least one second RE includes the ZP CSI-RS according to the second configuration information, the method may further include that:

the terminal device receives the second configuration information from a network device through system broadcast signaling or Radio Resource Control (RRC) dedicated signaling.

In an exemplary implementation mode of the first embodiment, the operation that the terminal device determines that the at least one second RE does not include the ZP CSI-RS or determines that the at least one second RE includes the ZP CSI-RS may include that:

the terminal device determines that the at least one second RE does not include the ZP CSI-RS or determines that the at least one second RE includes the ZP CSI-RS according to second preconfiguration information, the second preconfiguration information indicating that the at least one second RE does not include the ZP CSI-RS or indicating that the at least one second RE includes the ZP CSI-RS.

In an exemplary implementation mode of the first embodiment, each PRB in the M PRBs may not include the ZP CSI-RS.

In an exemplary implementation mode of the first embodiment, each PRB in the L PRBs may not include the ZP CSI-RS.

In an exemplary implementation mode of the first embodiment, PRB grids of the M PRBs and the N PRBs may be inconsistent.

A second embodiment of the application provides a signal transmission method, transmission of an SS block occupies M PRBs, a ZP CSI-RS is located on N PRBs, the N PRBs may include a first PRB and/or a second PRB, the first PRB may be partially overlapped with a maximum-frequency PRB in the M PRBs, and the second PRB may be partially overlapped with a minimum-frequency PRB in the M PRBs, M and N being positive integers, and in a case where the ZP CSI-RS is located on a symbol occupied by the SS block, the method may include that:

a network device sends first configuration information to a terminal device, the first configuration information indicating that at least one first RE does not include the ZP CSI-RS or indicating that the at least one first RE includes the ZP CSI-RS, the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

Accordingly, in the signal transmission method of the embodiments of the application, in a case where the ZP CSI-RS is located on the symbol occupied by the SS block, the network device configures the first configuration information indicating that the at least one first RE does not include the ZP CSI-RS or indicating that the at least one first RE includes the ZP CSI-RS for the terminal device, so that the terminal device can determine, according to the first configuration information, one or more REs occupied by the ZP CSI-RS in the at least one first RE under the condition that a PRB grid for the SS block is inconsistent with a common PRB grid.

In an exemplary implementation mode of the second embodiment, the operation that the network device sends the first configuration information to the terminal device may include that:

the network device sends the first configuration information to the terminal device through system broadcast signaling or RRC dedicated signaling.

In an exemplary implementation mode of the second embodiment, transmission of a PSS in the SS block may occupy L PRBs, the N PRBs may include a third PRB and/or a fourth PRB, the third PRB may be partially overlapped with a maximum-frequency PRB in the L PRBs, the fourth PRB may be partially overlapped with a minimum-frequency PRB in the L PRBs, L being a positive integer larger than M, and in a case where the ZP CSI-RS is located on a symbol occupied by the PSS in the SS block, the method may further include that:

the network device sends second configuration information to the terminal device, the second configuration information indicating that at least one second RE does not include the ZP CSI-RS or indicating that the at least one second RE includes the ZP CSI-RS, the at least one second RE being at least one RE, except one or more REs overlapped with the maximum-frequency PRB in the L PRBs, in the third PRB, and/or, the at least one second RE being at least one RE, except one or more REs overlapped with the minimum-frequency PRB in the L PRBs, in the fourth PRB.

Accordingly, in the signal transmission method of the embodiments of the application, in a case where the ZP CSI-RS is located on the symbol occupied by the SS block, the network device configures the second configuration information indicating that the at least one second RE does not include the ZP CSI-RS or indicating that the at least one second RE includes the ZP CSI-RS for the terminal device, so that the terminal device can determine, according to the second configuration information, one or more REs occupied by the ZP CSI-RS in the at least one second RE under the condition that the PRB grid for the SS block is inconsistent with the common PRB grid.

In an exemplary implementation mode of the second embodiment, the operation that the network device sends the second configuration information to the terminal device may include that:

the network device sends the second configuration information to the terminal device through system broadcast signaling or Radio Resource Control (RRC) dedicated signaling.

In an exemplary implementation mode of the second embodiment, each PRB in the M PRBs may not include the ZP CSI-RS.

In an exemplary implementation mode of the second embodiment, each PRB in the L PRBs may not include the ZP CSI-RS.

A third embodiment of the application provides a signal transmission method. In the signal transmission method, transmission of a PSS in an SS block occupies M PRBs, a ZP CSI-RS is located on N PRBs, the N PRBs may include a first PRB and/or a second PRB, the first PRB may be partially overlapped with a maximum-frequency PRB in the M PRBs, and the second PRB may be partially overlapped with a minimum-frequency PRB in the M PRBs, M and N being positive integers, and in a case where the ZP CSI-RS is located on a symbol occupied by the PSS, the method may include that:

a terminal device determines that at least one RE does not include the ZP CSI-RS or determines that the at least one RE includes the ZP CSI-RS, the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

Accordingly, in the signal transmission method of the embodiments of the application, in a case where the ZP CSI-RS is located on a symbol occupied by the SS block, the terminal device may determine that the at least one RE does not include the ZP CSI-RS or determine that the at least one RE includes the ZP CSI-RS, so that the terminal device can determine one or more REs occupied by the ZP CSI-RS in the at least one RE under the condition that a PRB grid for the SS block is inconsistent with a common PRB grid.

In an exemplary implementation mode of the third embodiment, in a case where the terminal device determines that the at least one RE includes the ZP CSI-RS, the method may further include that:

the terminal device determines, according to a pattern of the ZP CSI-RS and the at least one RE, one or more REs occupied by the ZP CSI-RS in the at least one RE.

In an exemplary implementation mode of the third embodiment, the operation that the terminal device determines that the at least one RE does not include the ZP CSI-RS or determines that the at least one RE includes the ZP CSI-RS may include that:

the terminal device determines that the at least one RE does not include the ZP CSI-RS or determines that the at least one RE includes the ZP CSI-RS according to first configuration information, the first configuration information indicating that the at least one RE does not include the ZP CSI-RS or indicating that the at least one RE includes the ZP CSI-RS.

In an exemplary implementation mode of the third embodiment, before the operation that the terminal device determines that the at least one RE does not include the ZP CSI-RS or determines that the at least one RE includes the ZP CSI-RS according to the first configuration information, the method may further include that:

the terminal device receives the first configuration information from a network device through system broadcast signaling or RRC dedicated signaling.

In an exemplary implementation mode of the third embodiment, the operation that the terminal device determines that the at least one RE does not include the ZP CSI-RS or determines that the at least one RE includes the ZP CSI-RS may include that:

the terminal device determines that the at least one RE does not include the ZP CSI-RS or determines that the at least one RE includes the ZP CSI-RS according to preconfiguration information, the preconfiguration information indicating that the at least one RE does not include the ZP CSI-RS or indicating that the at least one RE includes the ZP CSI-RS.

In an exemplary implementation mode of the third embodiment, each PRB in the M PRBs may not include the ZP CSI-RS.

A fourth embodiment of the application provides a signal transmission method, transmission of a PSS in an SS block occupies M PRBs, a ZP CSI-RS is located on N PRBs, the N PRBs may include a first PRB and/or a second PRB, the first PRB may be partially overlapped with a maximum-frequency PRB in the M PRBs, and the second PRB may be partially overlapped with a minimum-frequency PRB in the M PRBs, M and N being positive integers, and in a case where the ZP CSI-RS is located on a symbol occupied by the PSS, the method may include that:

a network device sends first configuration information to a terminal device, the first configuration information indicating that at least one RE does not include the ZP CSI-RS or indicating that the at least one RE includes the ZP CSI-RS, the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

Accordingly, in the signal transmission method of the embodiments of the application, in a case where the ZP CSI-RS is located on the symbol occupied by the SS block, the network device configures the first configuration information indicating that the at least one RE does not include the ZP CSI-RS or indicating that the at least one RE includes the ZP CSI-RS for the terminal device, so that the terminal device can determine, according to the first configuration information, one or more REs occupied by the ZP CSI-RS in the at least one RE under the condition that a PRB grid for the SS block is inconsistent with a common PRB grid.

In an exemplary implementation mode of the fourth embodiment, the operation that the network device sends the first configuration information to the terminal device may include that:

the network device sends the first configuration information to the terminal device through system broadcast signaling or RRC dedicated signaling.

In an exemplary implementation mode of the fourth embodiment, each PRB in the M PRBs may not include the ZP CSI-RS.

A fifth embodiment of the application provides a terminal device, which may include modules or units executing the method in the first embodiment or any optional implementation mode of the first embodiment.

A sixth embodiment of the application provides a network device, which may include modules or units executing the method in the second embodiment or any optional implementation mode of the second embodiment.

A seventh embodiment of the application provides a terminal device, which may include modules or units executing the method in the third embodiment or any optional implementation mode of the third embodiment.

An eighth embodiment of the application provides a network device, which may include modules or units executing the method in the fourth embodiment or any optional implementation mode of the fourth embodiment.

A ninth embodiment of the application provides a terminal device, which includes a processor, a memory and a communication interface. The processor is connected with the memory and the communication interface. The memory is configured to store an instruction, the processor is configured to execute the instruction, and the communication interface is configured to communicate with another network element under control of the processor. When the processor executes the instruction stored in the memory, such execution enables the processor to execute the method in the first embodiment or any possible implementation mode of the first embodiment.

A tenth embodiment of the application provides a network device, which includes a processor, a memory and a communication interface. The processor is connected with the memory and the communication interface. The memory is configured to store an instruction, the processor is configured to execute the instruction, and the communication interface is configured to communicate with another network element under control of the processor. When the processor executes the instruction stored in the memory, such execution enables the processor to execute the method in the second embodiment or any possible implementation mode of the second embodiment.

An eleventh embodiment of the application provides a terminal device, which includes a processor, a memory and a communication interface. The processor is connected with the memory and the communication interface. The memory is configured to store an instruction, the processor is configured to execute the instruction, and the communication interface is configured to communicate with another network element under control of the processor. When the processor executes the instruction stored in the memory, such execution enables the processor to execute the method in the third embodiment or any possible implementation mode of the third embodiment.

A twelfth embodiment of the application provides a network device, which includes a processor, a memory and a communication interface. The processor is connected with the memory and the communication interface. The memory is configured to store an instruction, the processor is configured to execute the instruction, and the communication interface is configured to communicate with another network element under control of the processor. When the processor executes the instruction stored in the memory, such execution enables the processor to execute the method in the fourth embodiment or any possible implementation mode of the fourth embodiment.

A thirteenth embodiment of the application provides a computer storage medium, in which a program code is stored, the program code being configured to indicate a computer to execute instructions of the methods in each embodiment.

A fourteenth embodiment of the application provides a computer program product including an instruction, which runs on a computer to enable the computer to execute the methods in each embodiment.

DETAILED DESCRIPTION OF THE EMBODIMENTS

The technical solutions in the embodiments of the application will be clearly and completely described below in combination with the drawings in the embodiments of the application.

The technical solutions of the embodiments of the application may be applied to a 5G NR communication system.

A terminal device in the embodiments of the application may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a 5G network, a terminal device in a future evolved Public Land Mobile Network (PLMN) or the like. There are no limits made in the embodiments of the application.

Each embodiment of the application is described in combination with a network device. The network device in the embodiments of the application network device may be a device configured to communicate with the terminal device. The network device may be an Evolutional NodeB (eNB or eNodeB) in a Long Term Evolution (LTE) system, and may also be a wireless controller in a Cloud Radio Access Network (CRAN) scenario. Or the network device may be a relay station, an access point, a vehicle-mounted device, a wearable device, a Next Generation Evolutional NodeB (NG-eNB), an access network device (for example, gNB) in the 5G network, an access network device in the future evolved PLMN or the like. There are no limits made in the embodiments of the application.

Figure 1:
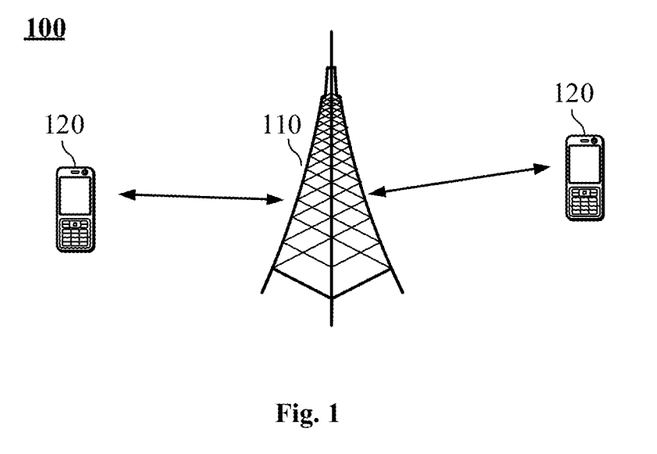
FIG. 1 is a schematic diagram of an application scenario according to an embodiment of the application.

A network device and two terminal devices are exemplarily illustrated in FIG. 1. A wireless communication system 100 may include multiple network devices and another number of terminal devices may be included in coverage of each network device. There are no limits made thereto in the embodiments of the application.

The wireless communication system 100 may further include another network entity such as an Access and Mobility Management Function (AMF), a Session Management Function (SMF), a Unified Data Management (UDM) and an Authentication Server Function (ASF). There are no limits made thereto in the embodiments of the application.

In addition, each embodiment or characteristic of the application may be implemented into a method, a device or a product programmed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). Moreover, various storage media described in the invention may represent one or more devices and/or other machine-readable media configured to store information. Term "machine-readable medium" may include, but not limited to, various media capable of storing, including and/or bearing instructions and/or data.

It is to be understood that terms "system" and "network" in the invention may usually be exchanged in the invention. In the invention, term "and/or" is only an association relationship describing associated objects and represents that three relationships may exist. For example, A and/or B may represent three conditions: i.e., independent existence of A, existence of both A and B and independent existence of B. In addition, character "/" in the invention usually represents that previous and next associated objects form an "or" relationship.

Figure 2:
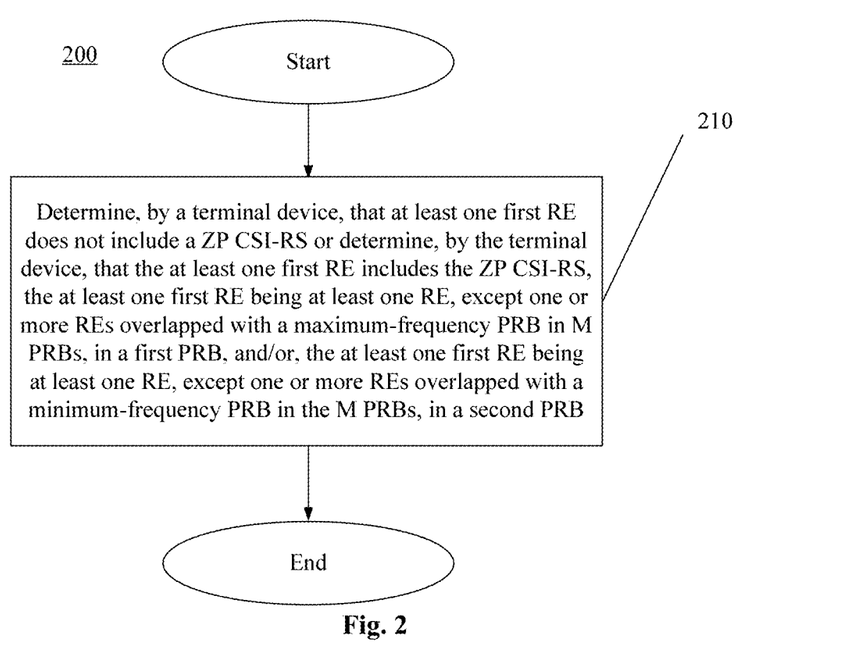
FIG. 2 is a schematic flowchart of a signal transmission method according to an embodiment of the application.

FIG. 2 is a schematic flowchart of a signal transmission method 200 according to an embodiment of the application. The method 200 may optionally be applied, but not limited, to a system shown in FIG. 1. In the method 200, transmission of an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the SS block, the method 200 includes at least part of contents in the following contents.

In 210, a terminal device determines that at least one first RE does not include the ZP CSI-RS or determines that the at least one first RE includes the ZP CSI-RS, the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

In some exemplary embodiments, the ZP CSI-RS is configured to perform interference measurement on a neighbor cell of a cell where the terminal device resides.

For example, in a case where the terminal device resides in a cell a and neighbor cells of the cell a include a cell b, a cell c and a cell d, the terminal device may perform interference measurement on the cell b, the cell c and the cell d by use of the ZP CSI-RS.

In some exemplary embodiments, the N PRBs are common PRBs configured for data transmission.

It is to be understood that the ZP CSI-RS may not be located in the first PRB and second PRB in the N PRBs. For example, when the terminal device determines that the at least one first RE does not include the ZP CSI-RS, the ZP CSI-RS may not be located in the first PRB and/or second PRB in the N PRBs.

In some exemplary embodiments, each PRB in the M PRBs does not include the ZP CSI-RS.

In some exemplary embodiments, PRB grids of the M PRBs and the N PRBs are inconsistent.

Figure 3:
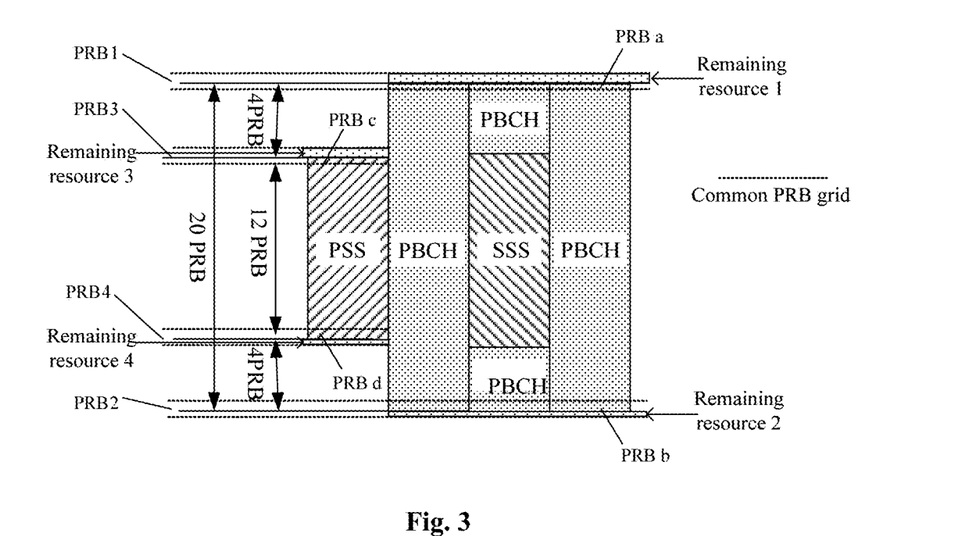
FIG. 3 is a schematic diagram of an SS block according to an embodiment of the application.

For example, the SS block in the embodiment of the application may be shown in FIG. 3. A mapping sequence of the SS block is PSS/PBCH/SSS/PBCH. Herein, transmission of the SS block occupies 20 PRBs (M=20). The PSS/SSS occupies a first symbol and a third symbol respectively, and a sequence length of the PSS/SSS is 127 and occupies 127 REs of 12 PRBs. The PBCH occupies 20 PRBs in a second symbol or a fourth symbol, and meanwhile, the PBCH occupies four PRBs on two sides of the SSS on the third symbol occupied by the SSS respectively.

As shown in FIG. 3, a grid of common PRBs is inconsistent with a grid of 20 PRBs occupied by transmission of the SS block, a PRB 1 in the common PRBs is partially overlapped with a maximum-frequency PRB a in the 20 PRBs, a PRB 2 in the common PRBs is partially overlapped with a minimum-frequency PRB b in the 20 PRBs, a remaining resource 1 is at least one RE, except one or more REs overlapped with the PRB a, in the PRB 1, and a remaining resource 2 is at least one RE, except one or more REs overlapped with the PRB b, in the PRB 2.

In the exemplary embodiment, the at least one first RE may be the remaining resource 1 and/or remaining resource 2 in FIG. 3.

In some exemplary embodiments, in a case where the terminal device determines that the at least one first RE includes the ZP CSI-RS, the terminal device can determine, according to a pattern of the ZP CSI-RS and the at least one first RE, one or more REs occupied by the ZP CSI-RS in the at least one first RE.

For example, the pattern of the ZP CSI-RS may include an RE 1, an RE 5 and an RE 9 (numbering is started with 0), the at least one first RE includes an RE 4, the RE 5, an RE 6, an RE 7, an RE 8, the RE 9, an RE 10 and an RE 11, and in such case, the terminal device may determine that the ZP CSI-RS occupies the RE 5 and the RE 9.

In some exemplary embodiments, the terminal device may receive first configuration information from a network device through system broadcast signaling or RRC dedicated signaling, the first configuration information indicating that the at least one first RE does not include the ZP CSI-RS or indicating that the at least one first RE includes the ZP CSI-RS.

In some exemplary embodiments, the terminal device may determine that the at least one first RE does not include the ZP CSI-RS or determines that the at least one first RE includes the ZP CSI-RS according to the first configuration information.

In some exemplary embodiments, the terminal device may determine that the at least one first RE does not include the ZP CSI-RS or determines that the at least one first RE includes the ZP CSI-RS according to first preconfiguration information, the first preconfiguration information indicating that the at least one first RE does not include the ZP CSI-RS or indicating that the at least one first RE includes the ZP CSI-RS.

It is to be understood that the first preconfiguration information is preconfigured for the terminal device.

In some exemplary embodiments, transmission of a PSS in the SS block occupies L PRBs, the N PRBs include a third PRB and/or a fourth PRB, the third PRB is partially overlapped with a maximum-frequency PRB in the L PRBs, and the fourth PRB is partially overlapped with a minimum-frequency PRB in the L PRBs, L being a positive integer larger than M.

In a case where the ZP CSI-RS is located on a symbol occupied by the PSS in the SS block, the method 200 further includes that:

the terminal device determines that at least one second RE does not include the ZP CSI-RS or determines that the at least one second RE includes the ZP CSI-RS, the at least one second RE being at least one RE, except one or more REs overlapped with the maximum-frequency PRB in the L PRBs, in the third PRB, and/or, the at least one second RE being at least one RE, except one or more REs overlapped with the minimum-frequency PRB in the L PRBs, in the fourth PRB.

In some exemplary embodiments, each PRB in the L PRBs does not include the ZP CSI-RS.

It is to be understood that the ZP CSI-RS may not be located in the third PRB and fourth PRB in the N PRBs. For example, when the terminal device determines that the at least one second RE does not include the ZP CSI-RS, the ZP CSI-RS may not be located in the third PRB and/or fourth PRB in the N PRBs.

Transmission of the PSS in the SS block occupies 12 PRBs (L=12).

For example, as shown in FIG. 3, the grid of the common PRBs is also inconsistent with a grid of the 12 PRBs occupied by the PSS, a PRB 3 in the common PRBs is partially overlapped with a maximum-frequency PRB c in the 12 PRBs, a PRB 4 in the common PRBs is partially overlapped with a minimum-frequency PRB d in the 12 PRBs, a remaining resource 3 is at least one RE, except one or more REs overlapped with the PRB c, in the PRB 3, and a remaining resource 4 is at least one RE, except one or more REs overlapped with the PRB d, in the PRB 4.

In some exemplary embodiments, the at least one second RE may be the remaining resource 3 and/or remaining resource 4 in FIG. 3.

In some exemplary embodiments, in a case where the terminal device determines that the at least one second RE includes the ZP CSI-RS, the terminal device may determine, according to a pattern of the ZP CSI-RS and the at least one second RE, one or more REs occupied by the ZP CSI-RS in the at least one second RE.

For example, the pattern of the ZP CSI-RS may include the RE 1, the RE 5 and the RE 9 (numbering is started with 0), the at least one second RE includes the RE 4, the RE 8, the RE 9, the RE 10 and the RE 11, and in such case, the terminal device may determine that the ZP CSI-RS occupies the RE 9.

In some exemplary embodiments, the terminal device may receive second configuration information from a network device through system broadcast signaling or Radio Resource Control (RRC) dedicated signaling, the second configuration information indicating that the at least one second RE does not include the ZP CSI-RS or indicating that the at least one second RE includes the ZP CSI-RS.

In some exemplary embodiments, the terminal device determines that the at least one second RE does not include the ZP CSI-RS or determines that the at least one second RE includes the ZP CSI-RS according to the second configuration information.

In some exemplary embodiments, the terminal device may determine that the at least one second RE does not include the ZP CSI-RS or determines that the at least one second RE includes the ZP CSI-RS according to second preconfiguration information, the second preconfiguration information indicating that the at least one second RE does not include the ZP CSI-RS or indicating that the at least one second RE includes the ZP CSI-RS.

It is to be understood that the second preconfiguration information is preconfigured for the terminal device.

Accordingly, in the signal transmission method of the embodiments of the application, in a case where the ZP CSI-RS is located on the symbol occupied by the SS block, the terminal device may determine that the at least one first RE does not include the ZP CSI-RS or determine that the at least one first RE includes the ZP CSI-RS, so that the terminal device can determine one or more REs occupied by the ZP CSI-RS in the at least one first RE under the condition that a PRB grid for the SS block is inconsistent with a common PRB grid.

Furthermore, the terminal device may determine that the at least one second RE does not include the ZP CSI-RS or determine that the at least one second RE includes the ZP CSI-RS, so that the terminal device can determine one or more REs occupied by the ZP CSI-RS in the at least one second RE under the condition that the PRB grid for the SS block is inconsistent with the common PRB grid.

Figure 4:
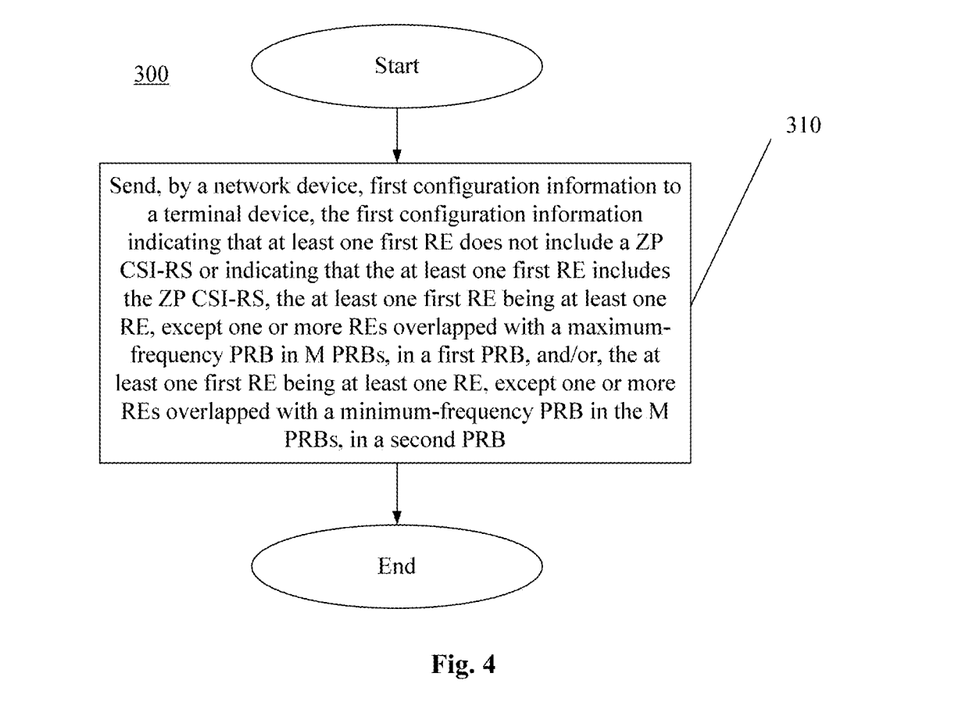
FIG. 4 is a schematic flowchart of another signal transmission method according to an embodiment of the application.

FIG. 4 is a schematic flowchart of a signal transmission method 300 according to an embodiment of the application. The method 300 may optionally be applied, but not limited, to a system shown in FIG. 1. In the method 300, transmission of an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the SS block, the method 300 includes at least part of contents in the following contents.

In 310, a network device sends first configuration information to a terminal device, the first configuration information indicating that at least one first RE does not include the ZP CSI-RS or indicating that the at least one first RE includes the ZP CSI-RS, the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

In some exemplary embodiments, each PRB in the M PRBs does not include the ZP CSI-RS.

In some exemplary embodiments, the network device sends the first configuration information to the terminal device through system broadcast signaling or RRC dedicated signaling.

In some exemplary embodiments, transmission of a PSS in the SS block occupies L PRBs, the N PRBs include a third PRB and/or a fourth PRB, the third PRB is partially overlapped with a maximum-frequency PRB in the L PRBs, and the fourth PRB is partially overlapped with a minimum-frequency PRB in the L PRBs, L being a positive integer larger than M.

In a case where the ZP CSI-RS is located on a symbol occupied by the PSS in the SS block, the method 300 further includes that:

the network device sends second configuration information to the terminal device, the second configuration information indicating that at least one second RE does not include the ZP CSI-RS or indicating that the at least one second RE includes the ZP CSI-RS, the at least one second RE being at least one RE, except one or more REs overlapped with the maximum-frequency PRB in the L PRBs, in the third PRB, and/or, the at least one second RE being at least one RE, except one or more REs overlapped with the minimum-frequency PRB in the L PRBs, in the fourth PRB.

In some exemplary embodiments, each PRB in the L PRBs does not include the ZP CSI-RS.

In some exemplary embodiments, the network device sends the second configuration information to the terminal device through system broadcast signaling or Radio Resource Control (RRC) dedicated signaling.

It is to be understood that the signal transmission method 300 corresponds to corresponding steps in the method 200, and the steps in the signal transmission method 300 may refer to descriptions about the corresponding steps in the signal transmission method 200 and, for simplicity, will not be elaborated herein.

Accordingly, in the signal transmission method of the embodiments of the application, in a case where the ZP CSI-RS is located on the symbol occupied by the SS block, the network device configures the first configuration information indicating that the at least one first RE does not include the ZP CSI-RS or indicating that the at least one first RE includes the ZP CSI-RS for the terminal device, so that the terminal device can determine, according to the first configuration information, one or more REs occupied by the ZP CSI-RS in the at least one first RE under the condition that a PRB grid for the SS block is inconsistent with a common PRB grid.

Furthermore, the network device configures the second configuration information indicating that the at least one second RE does not include the ZP CSI-RS or indicating that the at least one second RE includes the ZP CSI-RS for the terminal device, so that the terminal device can determine, according to the second configuration information, one or more REs occupied by the ZP CSI-RS in the at least one second RE under the condition that the PRB grid for the SS block is inconsistent with the common PRB grid.

Figure 5:
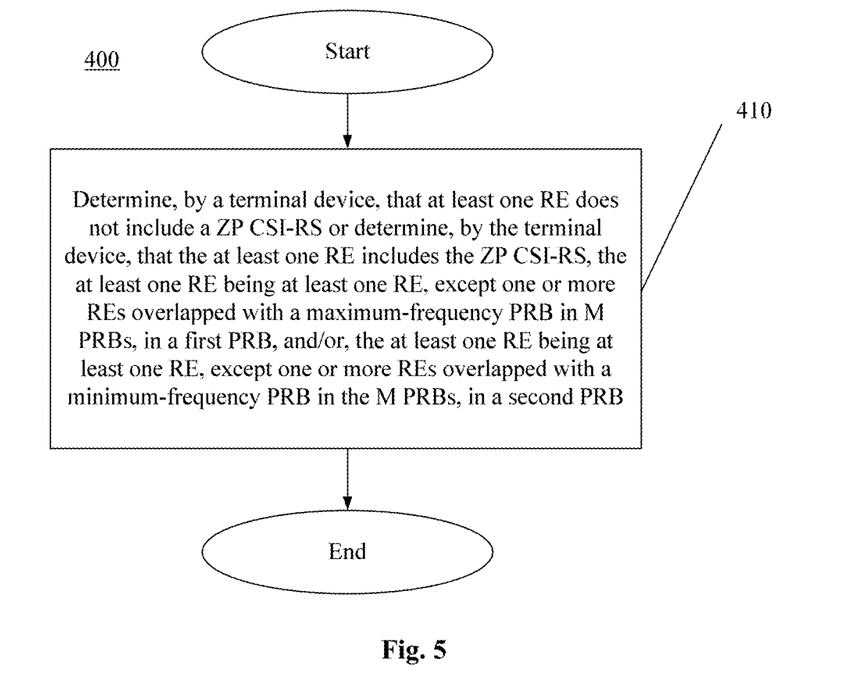
FIG. 5 is a schematic flowchart of another signal transmission method according to an embodiment of the application.

FIG. 5 is a schematic flowchart of a signal transmission method 400 according to an embodiment of the application. The method 400 may optionally be applied, but not limited, to a system shown in FIG. 1. In the method 400, Transmission of a PSS in an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the SS block, the method 400 includes at least part of contents in the following contents.

In 410, a terminal device determines that at least one RE does not include the ZP CSI-RS or determines that the at least one RE includes the ZP CSI-RS, the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

For example, as shown in FIG. 3, the grid of the common PRBs is also inconsistent with a grid of the 12 PRBs occupied by the PSS, a PRB 3 in the common PRBs is partially overlapped with a maximum-frequency PRB c in the 12 PRBs, a PRB 4 in the common PRBs is partially overlapped with a minimum-frequency PRB d in the 12 PRBs, a remaining resource 3 is at least one RE, except one or more REs overlapped with the PRB c, in the PRB 3, and a remaining resource 4 is at least one RE, except one or more REs overlapped with the PRB d, in the PRB 4.

In some exemplary embodiments, the at least one RE may be the remaining resource 3 and/or remaining resource 4 in FIG. 3.

In some exemplary embodiments, each PRB in the M PRBs does not include the ZP CSI-RS.

In some exemplary embodiments, in a case where the terminal device determines that the at least one RE includes the ZP CSI-RS, the terminal device determines, according to a pattern of the ZP CSI-RS and the at least one RE, one or more REs occupied by the ZP CSI-RS in the at least one RE.

In some exemplary embodiments, the terminal device receives first configuration information from a network device through system broadcast signaling or RRC dedicated signaling, the first configuration information indicating that the at least one RE does not include the ZP CSI-RS or indicating that the at least one RE includes the ZP CSI-RS.

In some exemplary embodiments, the terminal device determines that the at least one RE does not include the ZP CSI-RS or determines that the at least one RE includes the ZP CSI-RS according to the first configuration information.

In some exemplary embodiments, the terminal device determines that the at least one RE does not include the ZP CSI-RS or determines that the at least one RE includes the ZP CSI-RS according to preconfiguration information, the preconfiguration information indicating that the at least one RE does not include the ZP CSI-RS or indicating that the at least one RE includes the ZP CSI-RS.

It is to be understood that the signal transmission method 400 corresponds to corresponding steps in the method 200, and the steps in the signal transmission method 400 may refer to descriptions about the corresponding steps in the signal transmission method 200 and, for simplicity, will not be elaborated herein.

Accordingly, in the signal transmission method of the embodiments of the application, in a case where the ZP CSI-RS is located on a symbol occupied by the SS block, the terminal device may determine that the at least one RE does not include the ZP CSI-RS or determine that the at least one RE includes the ZP CSI-RS, so that the terminal device can determine one or more REs occupied by the ZP CSI-RS in the at least one RE under the condition that a PRB grid for the SS block is inconsistent with a common PRB grid.

Figure 6:
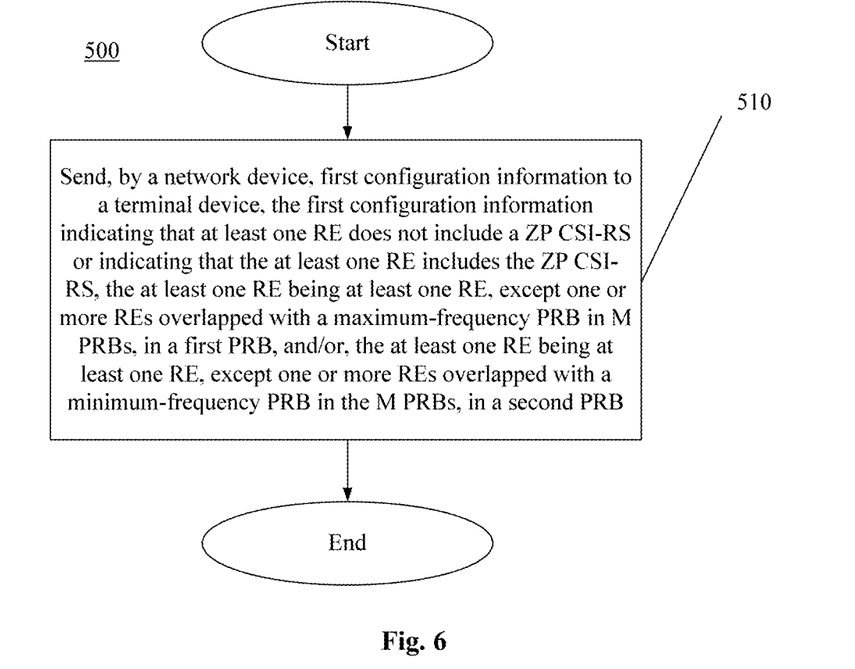
FIG. 6 is a schematic flowchart of another signal transmission method according to an embodiment of the application.

FIG. 6 is a schematic flowchart of a signal transmission method 500 according to an embodiment of the application. The method 500 may optionally be applied, but not limited, to a system shown in FIG. 1. In the method 500, transmission of a PSS in an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the SS block, the method 500 includes at least part of contents in the following contents.

In 510, a network device sends first configuration information to a terminal device, the first configuration information indicating that at least one RE does not include the ZP CSI-RS or indicating that the at least one RE includes the ZP CSI-RS, the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

In some exemplary embodiments, the network device sends the first configuration information to the terminal device through system broadcast signaling or RRC dedicated signaling.

In some exemplary embodiments, each PRB in the M PRBs does not include the ZP CSI-RS.

It is to be understood that the signal transmission method 500 corresponds to corresponding steps in the method 200, and the steps in the signal transmission method 500 may refer to descriptions about the corresponding steps in the signal transmission method 200 and, for simplicity, will not be elaborated herein.

Accordingly, in the signal transmission method of the embodiments of the application, in a case where the ZP CSI-RS is located on the symbol occupied by the SS block, the network device configures the first configuration information indicating that the at least one RE does not include the ZP CSI-RS or indicating that the at least one RE includes the ZP CSI-RS for the terminal device, so that the terminal device can determine, according to the first configuration information, one or more REs occupied by the ZP CSI-RS in the at least one RE under the condition that a PRB grid for the SS block is inconsistent with a common PRB grid.

Figure 7:
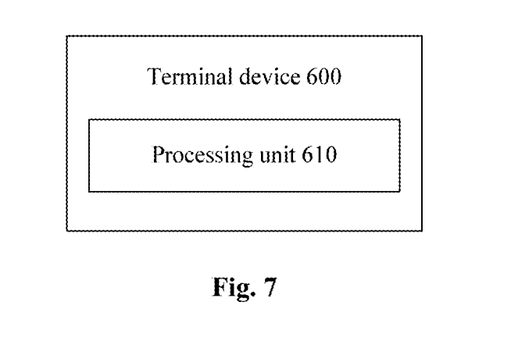
FIG. 7 is a schematic block diagram of a terminal device according to an embodiment of the application.

FIG. 7 is a schematic block diagram of a terminal device 600 according to an embodiment of the application. transmission of an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the SS block, as shown in FIG. 7, the terminal device 600 includes a processing unit 610. The processing unit 610 is configured to determine that at least one first RE does not include the ZP CSI-RS or determine that the at least one first RE includes the ZP CSI-RS, the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

It is to be understood that the terminal device 600 may correspond to the terminal device in the method 200 and may implement corresponding operations implemented by the terminal device in the method 200. For simplicity, no more elaborations will be made herein.

Figure 8:
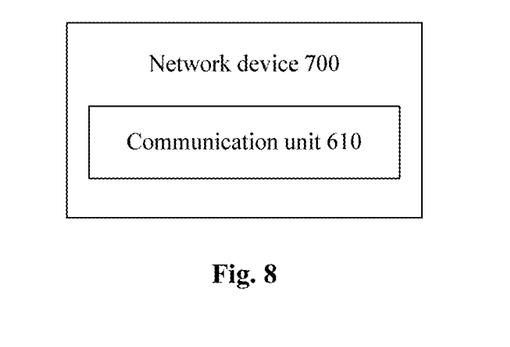
FIG. 8 is a schematic block diagram of a network device according to an embodiment of the application.

FIG. 8 is a schematic block diagram of a network device 700 according to an embodiment of the application, transmission of an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the SS block, the network device 700 includes a communication unit 710. The communication unit 710 is configured to send first configuration information to a terminal device, the first configuration information indicating that at least one first RE does not include the ZP CSI-RS or indicating that the at least one first RE includes the ZP CSI-RS, the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

It is to be understood that the network device 700 may correspond to the network device in the method 300 and may implement corresponding operations implemented by the network device in the method 300. For simplicity, no more elaborations will be made herein.

Figure 9:
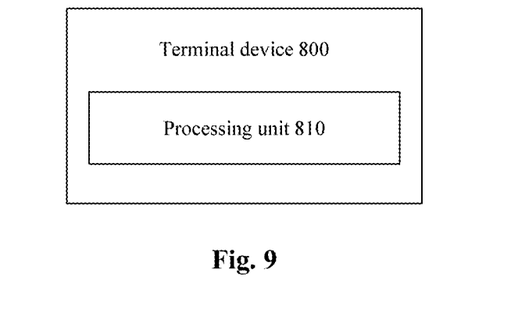
FIG. 9 is a schematic block diagram of another terminal device according to an embodiment of the application.

FIG. 9 is a schematic block diagram of a terminal device 800 according to an embodiment of the application. Transmission of a PSS in an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the PSS, the terminal device 800 includes a processing unit 810. The processing unit 810 is configured to determine that at least one RE does not include the ZP CSI-RS or determine that the at least one RE includes the ZP CSI-RS, the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

It is to be understood that the terminal device 800 may correspond to the terminal device in the method 400 and may implement corresponding operations implemented by the terminal device in the method 400. For simplicity, no more elaborations will be made herein.

Figure 10:
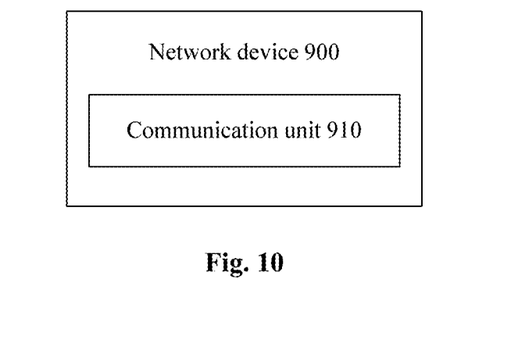
FIG. 10 is a schematic block diagram of another network device according to an embodiment of the application.

FIG. 10 is a schematic block diagram of a network device 900 according to an embodiment of the application. Transmission of a PSS in an SS block occupies M PRBs, and a ZP CSI-RS is located on N PRBs, wherein the N PRBs include a first PRB and/or a second PRB, the first PRB is partially overlapped with a maximum-frequency PRB in the M PRBs, and the second PRB is partially overlapped with a minimum-frequency PRB in the M PRBs, M and N being positive integers. In a case where the ZP CSI-RS is located on a symbol occupied by the PSS, the network device 900 includes a communication unit 910. The communication unit 910 is configured to send first configuration information to a terminal device, the first configuration information indicating that at least one RE does not include the ZP CSI-RS or indicating that the at least one RE includes the ZP CSI-RS, the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

It is to be understood that the network device 900 may correspond to the network device in the method 500 and may implement corresponding operations implemented by the network device in the method 500. For simplicity, no more elaborations will be made herein.

Figure 11:
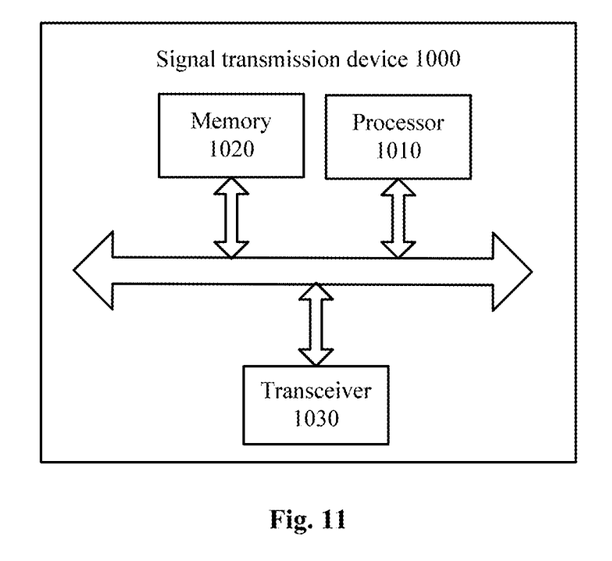
FIG. 11 is a schematic block diagram of a signal transmission device according to an embodiment of the application.

FIG. 11 is a schematic block diagram of a signal transmission device 1000 according to an embodiment of the application. The device 1000 includes:

a memory 1010, configured to store a program, the program including a code;

a transceiver 1020, configured to communicate with another device; and a processor 1030, configured to execute the program code in the memory 1010.

In some exemplary embodiments, the transceiver 1020 is configured to execute signal transmission and reception under driving of the processor 1030.

In some exemplary embodiments, when the code is executed, the processor 1030 may further implement each operation executed by the terminal device in the method 200 in FIG. 2 and/or the method 400 in FIG. 5. For simplicity, no more elaborations will be made herein. In such case, the device 1000 may be a terminal device, for example, a mobile phone.

In some exemplary embodiments, when the code is executed, the processor 1030 may implement each operation executed by the network device in the method 300 in FIG. 4 and/or the method 500 in FIG. 6. For simplicity, no more elaborations will be made herein. In such case, the device 1000 may be a network device, for example, a base station.

It is to be understood that, in the embodiment of the application, the processor 1030 may be a Central Processing Unit (CPU), and the processor 1030 may also be another universal processor, a Digital Signal Processor (DSP), an Application Specific Integrated Circuit (ASIC), a Field-Programmable Gate Array (FPGA) or another programmable logic device, a discrete gate or a transistor logic device, a discrete hardware component and the like. The universal processor may be a microprocessor, or the processor may also be any conventional processor and the like.

The memory 1010 may include a read-only memory and a random access memory, and provides an instruction and data for the processor 1030. A part of the memory 1010 may further include a nonvolatile random access memory. For example, the memory 1010 may further store information of a device type.

The transceiver 1020 may be configured to realize signal sending and receiving functions, for example, frequency modulation and demodulation functions or up-conversion and down-conversion functions.

In an implementation process, at least one step of the method may be completed through an integrated logical circuit of hardware in the processor 1030, or the integrated logical circuit may complete the at least one step under driving of an instruction in a software form. Therefore, the signal transmission device 1000 may be a chip or a chip set. The steps of the method disclosed in combination with the embodiments of the application may be directly embodied to be executed and completed by a hardware processor or executed and completed by a combination of hardware and software modules in the processor. The software module may be located in a mature storage medium in this field such as a random access memory, a flash memory, a read-only memory, a programmable read-only memory or electrically erasable programmable read-only memory and a register. The storage medium is located in the memory, and the processor 1030 reads information in the memory, and completes the steps of the methods in combination with hardware. No more detailed descriptions will be made herein to avoid repetitions.

Figure 12:
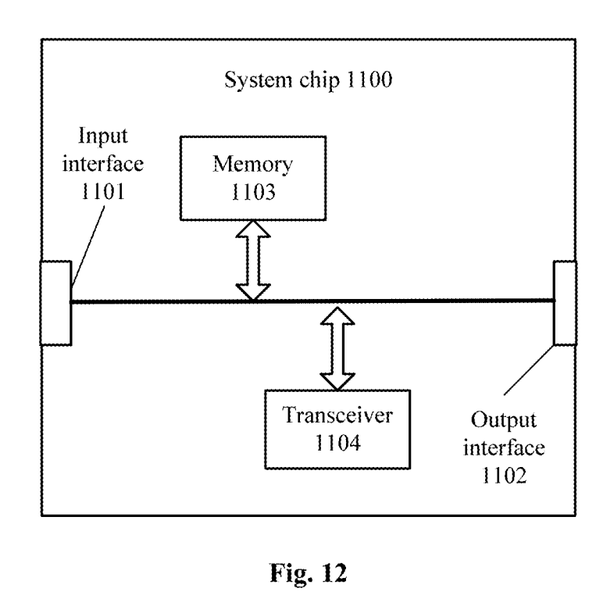
FIG. 12 is a schematic structure diagram of a system chip according to an embodiment of the application.

FIG. 12 is a schematic structure diagram of a system chip 1100 according to an embodiment of the application. The system chip 1100 of FIG. 12 includes an input interface 1101, output interface 1102, processor 1103 and memory 1104 which may be connected through an internal communication connecting line. The processor 1103 is configured to execute a code in the memory 1104.

In some exemplary embodiments, when the code is executed, the processor 1103 implements the methods executed by the terminal device in the method embodiments. For simplicity, no more elaborations will be made herein.

In some exemplary embodiments, when the code is executed, the processor 1103 implements the methods executed by the network device in the method embodiments. For simplicity, no more elaborations will be made herein.

The embodiments may be implemented completely or partially through software, hardware, firmware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the application are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a Solid State Disk (SSD)) or the like.

It is to be understood that, in various embodiments of the application, a magnitude of a sequence number of each process does not mean an execution sequence and the execution sequence of each process should be determined by its function and an internal logic and should not form any limit to an implementation process of the embodiments of the application.

Those skilled in the art may clearly learn about that, for convenient and brief description, working processes of the system, device and unit described above may refer to the corresponding processes in the method embodiments and will not be elaborated herein.

The above is only the exemplary implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

What is claimed is:

1. A signal transmission method, wherein transmission of a Synchronization Signal (SS) block occupies M Physical Resource Blocks (PRBs), a Zero Power Channel State Information Reference Signal (ZP CSI-RS) is located on N PRBs, the N PRBs comprise a first PRB and/or a second PRB, the first PRB is partially overlapped with a maximum-frequency PRB in the M PRBs, and the second PRB is partially overlapped with a minimum-frequency PRB in the M PRBs, M and N being positive integers; and in a case where the ZP CSI-RS is located on a symbol occupied by the SS block, the method comprises:
determining, by a terminal device, that at least one first Resource Element (RE) does not comprise the ZP CSI-RS or determining, by the terminal device, that the at least one first RE comprises the ZP CSI-RS,
the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

2. The method as claimed in claim 1, in a case where the terminal device determines that the at least one first RE comprises the ZP CSI-RS, further comprising:
determining, by the terminal device according to a pattern of the ZP CSI-RS and the at least one first RE, one or more REs occupied by the ZP CSI-RS in the at least one first RE.

3. The method as claimed in claim 1 wherein determining, by the terminal device, that the at least one first RE does not comprise the ZP CSI-RS or determining, by the terminal device, that the at least one first RE comprises the ZP CSI-RS comprises:
determining, by the terminal device, that the at least one first RE does not comprise the ZP CSI-RS or determining, by the terminal device, that the at least one first RE comprises the ZP CSI-RS according to first configuration information, the first configuration information indicating that the at least one first RE does not comprise the ZP CSI-RS or indicating that the at least one first RE comprises the ZP CSI-RS;
or,
determining, by the terminal device, that the at least one first RE does not comprise the ZP CSI-RS or determining, by the terminal device, that the at least one first RE comprises the ZP CSI-RS according to first preconfiguration information, the first preconfiguration information indicating that the at least one first RE does not comprise the ZP CSI-RS or indicating that the at least one first RE comprises the ZP CSI-RS.

4. The method as claimed in claim 3, before determining, by the terminal device, that the at least one first RE does not comprise the ZP CSI-RS or determining, by the terminal device, that the at least one first RE comprises the ZP CSI-RS according to the first configuration information or according to the first preconfiguration information, further comprising:
receiving, by the terminal device, the first configuration information or the first preconfiguration information from a network device through system broadcast signaling or Radio Resource Control (RRC) dedicated signaling.

5. The method as claimed in claim 1, wherein transmission of a Primary Synchronization Signal (PSS) in the SS block occupies L PRBs, the N PRBs comprise a third PRB and/or a fourth PRB, the third PRB is partially overlapped with a maximum-frequency PRB in the L PRBs, and the fourth PRB is partially overlapped with a minimum-frequency PRB in the L PRBs, L being a positive integer larger than M, and in a case where the ZP CSI-RS is located on a symbol occupied by the PSS, the method further comprises:
determining, by the terminal device, that at least one second RE does not comprise the ZP CSI-RS or determining, by the terminal device, that the at least one second RE comprises the ZP CSI-RS,
the at least one second RE being at least one RE, except one or more REs overlapped with the maximum-frequency PRB in the L PRBs, in the third PRB, and/or, the at least one second RE being at least one RE, except one or more REs overlapped with the minimum-frequency PRB in the L PRBs, in the fourth PRB.

6. The method as claimed in claim 5, in a case where the terminal device determines that the at least one second RE comprises the ZP CSI-RS, further comprising:
determining, by the terminal device according to a pattern of the ZP CSI-RS and the at least one second RE, one or more REs occupied by the ZP CSI-RS in the at least one second RE.

7. The method as claimed in claim 5, wherein determining, by the terminal device, that the at least one second RE does not comprise the ZP CSI-RS or determining, by the terminal device, that the at least one second RE comprises the ZP CSI-RS comprises:
determining, by the terminal device, that the at least one second RE does not comprise the ZP CSI-RS or determining, by the terminal device, that the at least one second RE comprises the ZP CSI-RS according to second configuration information, the second configuration information indicating that the at least one second RE does not comprise the ZP CSI-RS or indicating that the at least one second RE comprises the ZP CSI-RS;
or,
determining, by the terminal device, that the at least one second RE does not comprise the ZP CSI-RS or determining, by the terminal device, that the at least one second RE comprises the ZP CSI-RS according to second preconfiguration information, the second preconfiguration information indicating that the at least one second RE does not comprise the ZP CSI-RS or indicating that the at least one second RE comprises the ZP CSI-RS.

8. The method as claimed in claim 7, before determining, by the terminal device, that the at least one second RE does not comprise the ZP CSI-RS or determining, by the terminal device, that the at least one second RE comprises the ZP CSI-RS according to the second configuration information or according to the second preconfiguration information, further comprising:
receiving, by the terminal device, the second configuration information or the second preconfiguration information from a network device through system broadcast signaling or Radio Resource Control (RRC) dedicated signaling.

9. A terminal device, wherein transmission of a Synchronization Signal (SS) block occupies M Physical Resource Blocks (PRBs), a Zero Power Channel State Information Reference Signal (ZP CSI-RS) is located on N PRBs, the N PRBs comprise a first PRB and/or a second PRB, the first PRB is partially overlapped with a maximum-frequency PRB in the M PRBs, and the second PRB is partially overlapped with a minimum-frequency PRB in the M PRBs, M and N being positive integers, and
the terminal device comprises:
a processing unit, configured to determine, in a case where the ZP CSI-RS is located on a symbol occupied by the SS block, that at least one first Resource Element (RE) does not comprise the ZP CSI-RS or determine that the at least one first RE comprises the ZP CSI-RS,
the at least one first RE being at least one RE, except one or more REs overlapped with the maximum-frequency PRB in the M PRBs, in the first PRB, and/or, the at least one first RE being at least one RE, except one or more REs overlapped with the minimum-frequency PRB in the M PRBs, in the second PRB.

10. The terminal device as claimed in claim 9, wherein, in a case where the processing unit determines that the at least one first RE comprises the ZP CSI-RS, the processing unit is further configured to determine, according to a pattern of the ZP CSI-RS and the at least one first RE, one or more REs occupied by the ZP CSI-RS in the at least one first RE.

11. The terminal device as claimed in claim 9, wherein the processing unit is configured to:
determine that the at least one first RE does not comprise the ZP CSI-RS or determine that the at least one first RE comprises the ZP CSI-RS according to first configuration information, the first configuration information indicating that the at least one first RE does not comprise the ZP CSI-RS or indicating that the at least one first RE comprises the ZP CSI-RS;
or,
determine that the at least one first RE does not comprise the ZP CSI-RS or determine that the at least one first RE comprises the ZP CSI-RS according to first preconfiguration information, the first preconfiguration information indicating that the at least one first RE does not comprise the ZP CSI-RS or indicating that the at least one first RE comprises the ZP CSI-RS.

12. The terminal device as claimed in claim 11, further comprising:
a communication unit, configured to, before the processing unit determines that the at least one first RE does not comprise the ZP CSI-RS or determines that the at least one first RE comprises the ZP CSI-RS according to the first configuration information or according to the first preconfiguration information, receive the first configuration information or the first preconfiguration information from a network device through system broadcast signaling or Radio Resource Control (RRC) dedicated signaling.

13. The terminal device as claimed in claim 9, wherein transmission of a Primary Synchronization Signal (PSS) in the SS block occupies L PRBs, the N PRBs comprise a third PRB and/or a fourth PRB, the third PRB is partially overlapped with a maximum-frequency PRB in the L PRBs, and the fourth PRB is partially overlapped with a minimum-frequency PRB in the L PRBs, L being a positive integer larger than M, and
in a case where the ZP CSI-RS is located on a symbol occupied by the PSS in the SS block, the processing unit is further configured to determine that at least one second RE does not comprise the ZP CSI-RS or determine that the at least one second RE comprises the ZP CSI-RS,
the at least one second RE being at least one RE, except one or more REs overlapped with the maximum-frequency PRB in the L PRBs, in the third PRB, and/or, the at least one second RE being at least one RE, except one or more REs overlapped with the minimum-frequency PRB in the L PRBs, in the fourth PRB.

14. The terminal device as claimed in claim 13, wherein, in a case where the processing unit determines that the at least one second RE comprises the ZP CSI-RS, the processing unit is further configured to determine, according to a pattern of the ZP CSI-RS and the at least one second RE, one or more REs occupied by the ZP CSI-RS in the at least one second RE.

15. The terminal device as claimed in claim 13, wherein the processing unit is configured to:
determine that the at least one second RE does not comprise the ZP CSI-RS or determine that the at least one second RE comprises the ZP CSI-RS according to second configuration information, the second configuration information indicating that the at least one second RE does not comprise the ZP CSI-RS or indicating that the at least one second RE comprises the ZP CSI-RS;
or,
determine that the at least one second RE does not comprise the ZP CSI-RS or determine that the at least one second RE comprises the ZP CSI-RS according to second preconfiguration information, the second preconfiguration information indicating that the at least one second RE does not comprise the ZP CSI-RS or indicating that the at least one second RE comprises the ZP CSI-RS.

16. The terminal device as claimed in claim 15, further comprising:
a communication unit, configured to, before the processing unit determines that the at least one second RE does not comprise the ZP CSI-RS or determines that the at least one second RE comprises the ZP CSI-RS according to the second configuration information or according to the second preconfiguration information, receive the second configuration information or the second preconfiguration information from a network device through system broadcast signaling or Radio Resource Control (RRC) dedicated signaling.

17. The terminal device as claimed in claim 9, wherein none of the M PRBs comprises the ZP CSI-RS; or, PRB grids of the M PRBs and the N PRBs are inconsistent.

18. The terminal device as claimed in claim 13, wherein none of the L PRBs comprises the ZP CSI-RS.

19. A terminal device, wherein transmission of a Primary Synchronization Signal (PSS) in a Synchronization Signal (SS) block occupies M Physical Resource Blocks (PRBs), a Zero Power Channel State Information Reference Signal (ZP CSI-RS) is located on N PRBs, the N PRBs comprise a first PRB and/or a second PRB, the first PRB is partially overlapped with a maximum-frequency PRB in the M PRBs, and the second PRB is partially overlapped with a minimum-frequency PRB in the M PRBs, M and N being positive integers, and the terminal device comprises:
a processing unit, configured to determine, in a case where the ZP CSI-RS is located on a symbol occupied by the PSS, that at least one Resource Element (RE) does not comprise the ZP CSI-RS or determining that the at least one RE comprises the ZP CSI-RS,
the at least one RE being at least one RE, except one or more REs overlapped with the maximum-frequency PRB in the M PRBs, in the first PRB, and/or, the at least one RE being at least one RE, except one or more REs overlapped with the minimum-frequency PRB in the M PRBs, in the second PRB.

20. The terminal device as claimed in claim 19, wherein, in a case where the processing unit determines that the at least one RE comprises the ZP CSI-RS, the processing unit is further configured to determine, according to a pattern of the ZP CSI-RS and the at least one RE, one or more REs occupied by the ZP CSI-RS in the at least one RE.

* * * * *